Dec. 15, 1964 H. T. PERKINS 3,161,884

REMOTE CONTROL FOR A PROJECTOR

Filed Dec. 20, 1960 2 Sheets-Sheet 1

INVENTOR.
Herbert Thomas Perkins
BY
Robert F. Miehle Jr.
Attys.

INVENTOR.
Herbert Thomas Perkins
BY
Robert F. Miehle, Jr.
Attys.

United States Patent Office 3,161,884

Patented Dec. 15, 1964

3,161,884

REMOTE CONTROL FOR A PROJECTOR

Herbert T. Perkins, Grayslake, Ill., assignor to Bell & Howell Company, Chicago, Ill., a corporation of Illinois Filed Dec. 20, 1960, Ser. No. 77,224
2 Claims. (Cl. 352—179)

This invention relates to a remote control for a projector, and more particularly to a gravity actuated selector switch for remotely controlling a motion picture projector.

An object of the invention is to provide a projector having a portable switch which may be turned as a whole to selected positions to control the operation of the projector.

Another object of the invention is to provide a portable switch unit having gravity actuated switch means the condition of which is determined by the gravitational position of the switch unit as a whole.

A complete understanding of the invention may be obtained from the following detailed description of a remote control forming a specific embodiment thereof, when read in conjunction with the appended drawings, in which.

The invention provides a remote control for a projector in which a switch unit may be manually rotated as a unit to actuate gravity switch means to selected positions to control, for example, the operation of a motion picture projector connected thereto by an electric cord. Preferably the switch unit includes a rectangular case carrying two gravity actuated switches disposed at a right angle relative to one another in such relative positions that when the case lies on one side thereof both switches are open, when the case lies on a second side thereof one switch is open and the other closed, when the case lies on a third side thereof the one switch is closed and the other open and when the case lies on the fourth side thereof both switches are closed. Thus, the user of the switch may operate it needing only turn the case to present the desired side in the upward position.

Figures 1, 2:
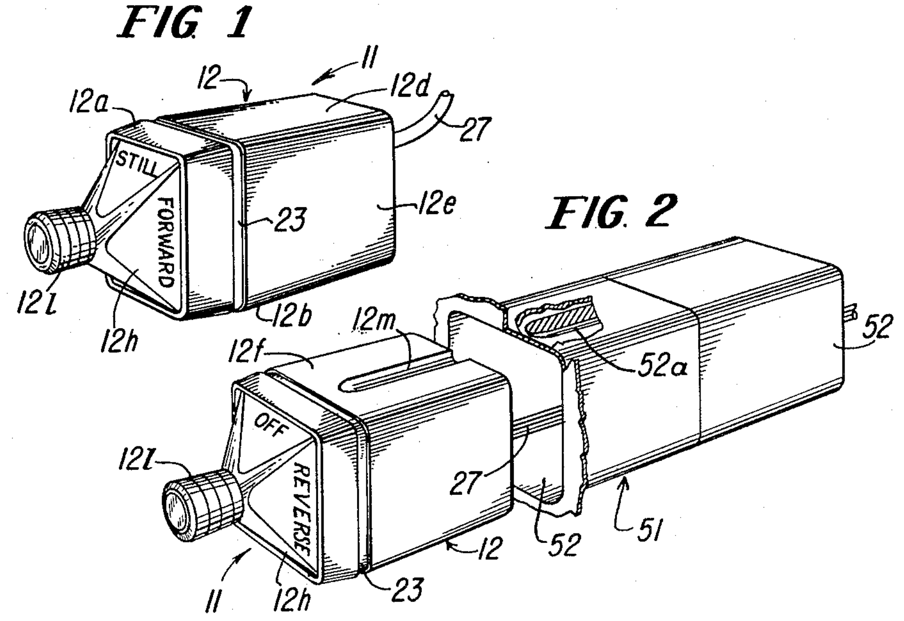
FIG. 1 is a perspective view of a switch unit of a remote control forming one embodiment of the invention.
FIG. 2 is a perspective view of the switch unit in a position different from that shown in FIG. 1.

Referring now in detail to the drawings, FIGS. 1 and 2 illustrate a manually movable remote control switch unit 11 in two of four positions of operation. The switch unit includes a case or housing 12 of a pair of molded, interfitting sections 12*a* and 12*b* of electrical insulation. The section 12*a* has known switch mounting brackets or spring clips 12 and 14 fixed to a plate portion 12*c* by screws 15, and the spring clips hold a pair of gravity actuated switches 16 and 17 in positions extending at 90° relative to one another and at 45° relative to sides or faces 12*d*, 12*e*, 12*f* and 12*g* of the case. When the switch unit is placed manually in its "STILL" position in which it rests on its face 12*f* (or has the face 12*f* facing downwardly), both switches 16 and 17 extend downwardly from their adjacent ends and mercury pools 16*a* and 17*a* close or bridge pairs of fixed switch contacts 16*b* and 16*c* and 17*b* and 17*c*, respectively. When the unit 11 is placed manually in its "OFF" position in which the face 12*d* faces downwardly, both switches 16 and 17 extend partially upwardly from their adjacent ends as illustrated in full lines in FIG. 5 and are open. When the unit is placed in its "REVERSE" position in which the face 12*e* is downward, the switch 16 is closed and the switch 17 is open. When the unit is located in its "FORWARD" position in which the face 12*g* is downward, the switch 16 is closed and the switch 17 is open.

Figure 3:
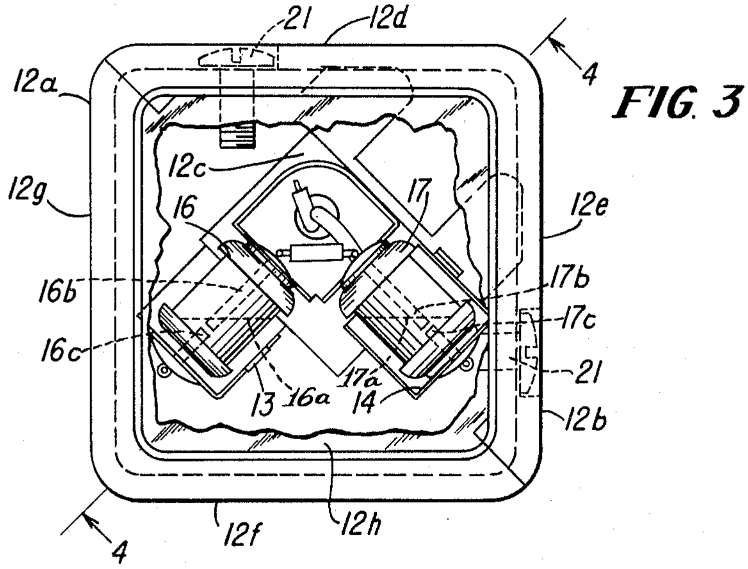
FIG. 3 is an end view of the switch unit.
Figures 4, 5:
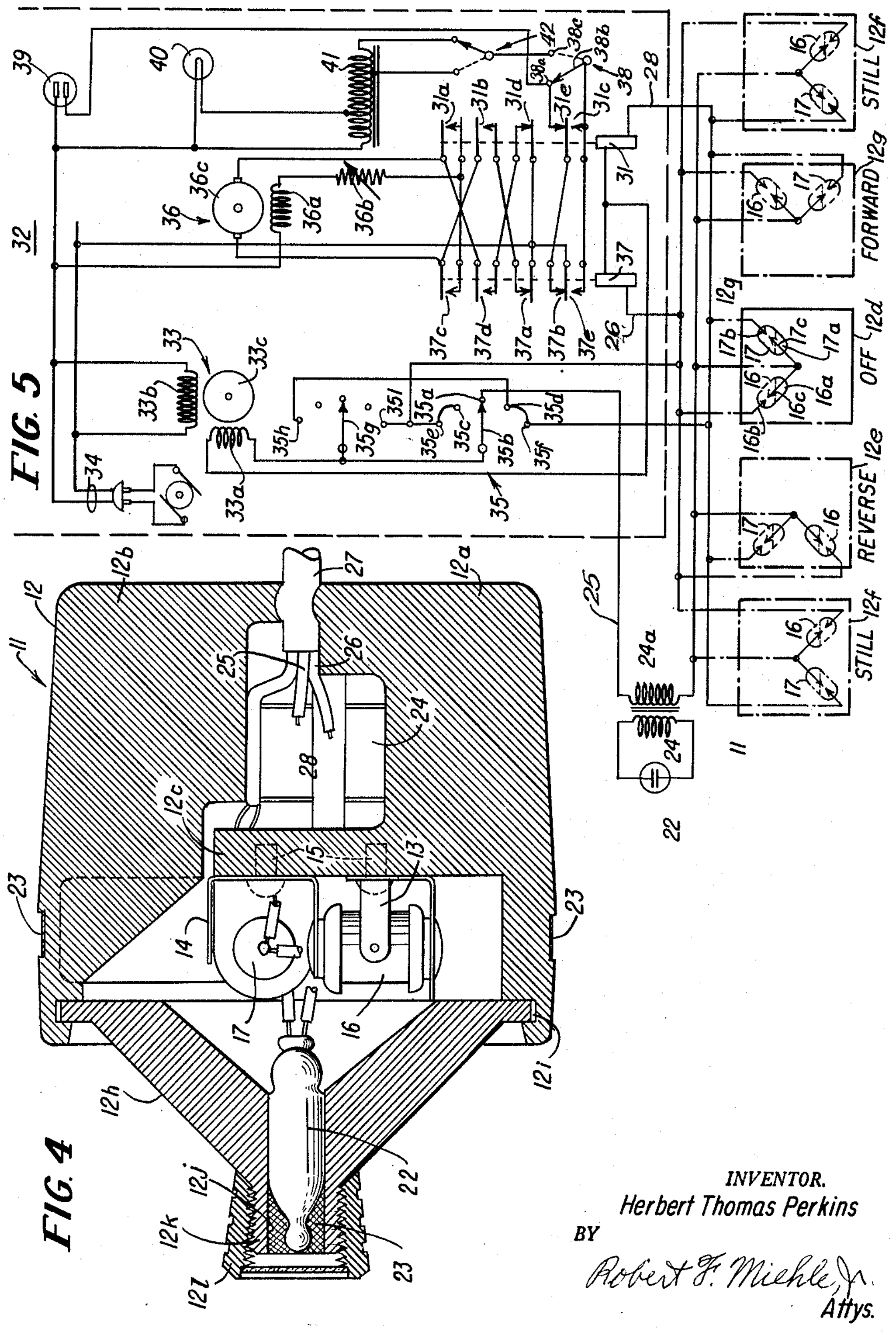
FIG. 4 is a sectional view taken along line 4—4 of FIG. 3.
FIG. 5 is a diagrammatic view of a motion picture projector control circuit including the switch unit of FIG. 1.

As shown in FIGS. 3 and 4, the two generally triangular case sections 12*a* and 12*b* are secured together by screws 21 threaded into the plate portion 12*c* and lock a pyramidal or funnel-shaped cap member 12*h* in annular groove 12*i*. The member 12*h* is of electrical insulation and is translucent, and a neon lamp 22 is fixed by cement 23 in central bore 12*j* in externally threaded stem 12*k*. A cap-like handle or knob 12*l* is threaded onto the stem. Decorative bands 23 are secured to the sections 12*a* and 12*b*. The bulb is electrically connected to the output of a transformer 24 mounted in the case with its primary connected between insulated conductor 25 of flexible, jacketed cord 27 and insulated conductors 26 and 28 through switches 16 and 17. The cap member has indicia 29 printed or engraved in the four faces thereof, the upwardly facing indicia indicating the position of the unit. When the small lamp 22 is illuminated, the light therefrom causes the cap member 12*h* to glow and the indicia to be readily seen.

To operate a motion picture projector in the forward direction, the user, who may be remote from the projector, turns the switch unit 11 from its "OFF" position as shown in full lines to its "FORWARD" position in which the face 12*g* of the case 12 faces downwardly, the switch 16 being open and the switch 17 being closed. The switch 17 closes the circuit to control relay 31 (FIG. 5) of a control circuit 32 mounted in the projector itself. A low voltage (below thirty volts) then is supplied to the winding of the relay 31 from a secondary winding 33*a* of a fan motor 33 of the shaded pole type having a main winding 33*b*, which in addition to driving the motor acts as a primary winding relative to the winding 33*a*, armature 33*c* and the usual stator of the motor serving as the core for transformer action therebetween. A power cord 34 is assumed to be plugged into a 110 volt alternating current power supply. The closed circuit to the relay 31 from the power supplying winding 33*a* also includes in series with the relay winding primary winding 24*a* of the low power step up transformer 24 and contact 35*a* and contactor 35*b* of manually operable, remote control overriding, selector switch 35 located at the projector itself, the switch 35 being set in its "OFF" position, as shown in FIG. 5, for remote control of the projector. The relay 31 pulls in to close contacts 31*a*, 31*b* and 31*c* and open contacts 31*d* and 31*e*. This operates in the forward direction a known projector driving motor 36 through a circuit from the power cord 34 including field winding 36*a*, speed controlling variable resistor 36*b*, the contacts 31*a*, armature 36*c*, the contacts 31*b*, and normally closed contacts 37*a* of relay 37. Until the film is threaded through the projector, a film actuated limit switch 38 is closed to contact 38*a* to light a room lamp plugged into receptacle 39 and power from the cord 34 is supplied to the room lamp through contacts 38*a*, 31*c* and 37*b*. Then when the film has been threaded through the projector it moves contactor 38*b* from contact 38*a* to contact 38*c* and holds it there to break the circuit to the room lamp and make the circuit to projector lamp 40 through autotransformer 41, switch 42 for varying the power to the lamp 40, the contact 38*c*, contactor 38*b*, and the contacts 31*c* and 37*b*. When the film runs out of the projector, the contactor 38*b* swings back to contact 38*a*, darkening the projection lamp 40 and relighting the room lamp.

For operation of the projector in reverse direction, the switch unit 11 is turned to its "REVERSE" position with the face 12*e* downward, the switch 35 being in its "OFF" position. In this position of the switch unit 11, the switch 17 is open and the switch 16 is closed to energize the winding of relay 37 through a circuit including the winding 24*a*, contacts 35*a* and power supplying winding 33*a*. The relay 37 then opens the contacts 37*a* and 37*b* and closes contacts 37*c*, 37*d* and 37*e*. The contacts 37*c* make the circuit to the motor 36 to run in the reverse direction from the power cord 34 through the resistor 36*a*, the contacts 37*c*, the armature 36*c* and the contacts 37*d* and 31*d*. The relay 37 also makes a circuit to the film actuated switch 38 to light either the room light receptacle 39 or the projection lamp transformer 41, depending on the position of the film actuated switch 38, through the contacts 37*e*.

For "STILL" projection, the user turns the switch unit 11 to its "STILL" position in which the face 12*f* is downwardly facing. In this position both the switches 16 and 17 are closed to energize the windings of both relays 31 and 37. Since both relays are energized, both contacts 31*d* and 37*a* are open and the film feeding and shutter driving motor 36 is de-energized, the blower motor continuing to run. The circuit to the film actuated switch 38 and the projection lamp 40 or the room lamp receptacle 39 is closed through both the sets of contacts 31*c* and 37*e*.

When the switch unit 11 is in its "OFF" position with the face 12*d* facing downwardly, both switches 16 and 17 are open so that the motor 36 and the projection lamp 40 are off, the room lamp is energized through 37*b* and 31*e*, and the blower motor 33 continues to run until the power cord 34 is disconnected from the power source.

The override switch 35 at the projector itself cuts off power to the remote control switch unit 11 whenever the user moves the contactor 35*b* from the contact 35*a*. To operate in the "FORWARD" direction, the contactor 35*b* is moved into engagement with contact 35*d* to energize the winding of relay 31. For "REVERSE" operation under the control of the switch 35, the contactor 35*b* is moved into engagement with contact 35*c* which prevents control by the remote control switch unit 11 and energizes the relay 37. For "STILL" operation, the switch contactor 35*b* may be turned to the next position from either of the contacts 35*c* and 35*d* to either contact 35*e* or contact 35*f*, respectively to energize both relays 31 and 37, a contactor 35*g* interlocked with the contactor 35*b* then being in engagement with either contact 35*h* or contact 35*i* which are interlinked with the relays 31 and 37.

The switch unit 11 is adapted to be used with a projector 51 (FIG. 2) having a known cord retracting device 52. The projector has a storage socket 52 for receiving the switch unit 11. The unit 11 has a keying or splining groove 12*m* in the face 12*f* which slides along keying rib 52*a*. The rib 52*a* prevents insertion of the unit 11 into the socket 52 except when the unit 11 is in its "OFF" position in which the face 12*f* is up. The retracting device resiliently pulls the cord 27 to urge the unit 11 into the socket 52.

The switch unit may be held manually and manipulated to the desired positon or it may be placed on the floor, a table, chair, sofa or other like convenient location adjacent to the user and need be only rolled or turned to selectively operate the projector.

While the invention is thus described, it is not wished to be limited to the precise details described, as changes may be readily made without departing from the spirit of the invention.

What is claimed is:

1. In a motion picture projector including a reversible electric drive motor, a projector lamp and a power source, the combination therewith of a first relay means operable when energized to connect the lamp to the power source and connect the reversible motor to the power source in a manner such as to run the projector in a forward direction, second relay means operable when energized to connect the lamp to the power source and connect the reversible motor to the power source in a manner such as to run the projector in a reverse direction, the first and second relay means being operable when both are energized to de-energize the motor and connect the lamp to the power source, a manually operable remote control switch unit including a pair of switches for selectively energizing only the first relay means, only the second relay means, and both the first and second relay means, and to de-energize both the first and second relay means, and manually operable switch means located at the projector having a plurality of positions for controlling the relay means and having one position connecting the remote control switch unit to the relay means.

2. In a motion picture projector including a reversible electric drive motor, a projector lamp and a power source, the combination therewith of a first relay means operable when energized to connect the lamp to the power source and connect the reversible motor to the power source in a manner such as to run the projector in a forward direction, second relay means operable when energized to connect the lamp to the power source and connect the reversible motor to the power source in a manner such as to run the projector in a reverse direction, the first and second relay means being operable when both are energized to de-energize the motor and connect the lamp to the power source, a remote control switch unit including a manually rotatable case and at least a pair of switches carried by the case for selectively energizing only the first relay means, only the second relay means, and both the first and second relay means, and to de-energize both the first and second relay means, and manually operable switch means located at the projector having a plurality of positions for controlling the relay means and having one position connecting the remote control switch unit to the relay means.

References Cited in the file of this patent

UNITED STATES PATENTS

| | | |
|---|---|---|
| 1,732,755 | Kerestes | Oct. 22, 1929 |
| 1,862,354 | Winne | June 7, 1932 |
| 1,913,910 | Altmayer | June 13, 1933 |
| 1,920,968 | Carpenter | Aug. 8, 1933 |
| 2,127,143 | Ross | Aug. 16, 1938 |
| 2,127,760 | Staley | Aug. 23, 1938 |
| 2,273,855 | Foster et al. | Feb. 24, 1942 |
| 2,437,252 | Gould | Mar. 9, 1948 |
| 3,023,669 | Hall | Mar. 6, 1962 |